United States Patent [19]

Han

[11] Patent Number: 5,354,972
[45] Date of Patent: Oct. 11, 1994

[54] POWER SUPPLY FOR A MICROWAVE RANGE

[75] Inventor: Gyung H. Han, Seoul, Rep. of Korea

[73] Assignee: Gold Star Co., Ltd., Seoul, Rep. of Korea

[21] Appl. No.: 948,385

[22] Filed: Sep. 21, 1992

[30] Foreign Application Priority Data

Sep. 19, 1991 [KR] Rep. of Korea ............... 91-15448

[51] Int. Cl.$^5$ ............................................. H05B 6/68
[52] U.S. Cl. .................................... 219/715; 219/716; 363/21
[58] Field of Search ............... 219/10.55 B, 715, 716, 219/718; 363/21, 96, 97, 98

[56] References Cited

U.S. PATENT DOCUMENTS

| | | | |
|---|---|---|---|
| 4,389,702 | 6/1983 | Clemente et al. | 363/21 |
| 4,412,347 | 10/1983 | Lipcon | 363/21 |
| 4,481,565 | 11/1984 | Colton | 363/21 |
| 4,495,555 | 1/1985 | Zikelboom | 363/96 |
| 4,812,960 | 3/1989 | Sakamoto et al. | 363/97 |
| 4,903,183 | 2/1990 | Noguchi et al. | 219/10.55 B |
| 4,933,830 | 6/1990 | Sato et al. | 219/10.55 B |
| 5,146,396 | 9/1992 | Eng et al. | 363/97 |

Primary Examiner—Philip H. Leung
Attorney, Agent, or Firm—Helfgott & Karas

[57] ABSTRACT

A power supply for a microwave range, which can control its own output voltage over a wide range of voltages by utilizing a voltage driving type switching element, and which includes a first transformer for driving a DC voltage, a switching element for driving the first transformer, a controller for supplying a switching signal which is pulse-width-modulated to the switching element, and a second transformer for transmitting the switching signal from the controller to the switching element. A buffer is coupled between the second transformer and the switching element for generating an amplified buffered switching signal, which maintains a constant DC voltage level and swing width so as to correctly drive the switching element.

20 Claims, 3 Drawing Sheets

POWER SUPPLY FOR A MICROWAVE RANGE

FIELD OF THE INVENTION

The present invention relates to a power supply for a microwave range utilizing a pulse width modulation signal, and particularly to a power supply for freely varying the output voltage.

PRIOR ART

The power supply of a conventional microwave range has a configuration such as that shown in FIG. 1. Referring to FIG. 1, a bridge circuit 12 consisting of four (4) diodes D1–D4 full-wave-rectifies an alternating current (AC) power supply voltage from an AC power line 10 and produces an unregulated direct current (DC) voltage. A series circuit of coil L1 and smoothing capacitor C1 connected to both terminals of the bridge circuit 12 filters the unregulated DC voltage. The filtered DC voltage is applied between a positive line 14 and a negative line 16, which are respectively connected to the two ends of the smoothing capacitor C1. A primary winding 20 of power transformer 18 and two resonance capacitors C2 and C3 are connected in series between the positive line 14 and the negative line 16. The DC voltage applied to the primary winding 20 of the power transformer 18 is transformed and induced to secondary, tertiary and auxiliary windings 22,24,26 of the power transformer 18. The primary winding 20 of the power transformer 18 is driven by two transistors Q1 and Q2, and a collector and an emitter of the transistor Q1 are respectively connected to the two ends of the resonance capacitor C2 while a collector and an emitter of the transistor Q2 are respectively connected to the two ends of the resonance capacitor C3. The AC voltage induced to the secondary winding 22 of the power transformer 18 is applied to a cathode heating electrode of a magnetron 28. The AC voltage induced to the tertiary winding 24 of the power transformer 18 is rectified and filtered by a smoothing capacitor C4 and a rectifier diode D5 and then applied between a heater circuit of the magnetron 28 and an anode. A synchronism detector 30 detects a zero crossing portion of the AC voltage induced to the auxiliary winding 26 of the power transformer 18 and then applies a sync detecting signal to a controller 32. An output detector 34 detects the voltage applied to the anode of the magnetron 28 and supplies the detected voltage to the controller 32. The controller 32 produces a driving signal of pulse width modulation (PWM) signal form on the basis of the output of the synchronism detector 30 and the output detector 34.

The pulse width of the driving signal is determined by the detected voltage from the output detector 34, and during this time the two transistors Q1 and Q2 are turned on. The period of the driving signal is determined by the sync detecting signal from the synchronism detector 30. The driving signal is fed to the base of the transistor Q3 and then switches the transistor Q3. As the transistor Q3 is switched, the driving transformer 36 transforms an invertor driving voltage applied to its primary winding 38 and induces an AC voltage of PWM signal form to its secondary winding 40 and a tertiary winding 42. The PWM signal induced to the secondary winding 40 of the driving transformer 36 is divided by two resistors R1 and R2. The transistor Q1 is switched in accordance with the logic state of the PWM signal applied to its base. The PWM signal induced to the tertiary winding 42 of the driving transformer 36 is also divided by two resistors R3 and R4. The transistor Q3 is switched in accordance with the PWM signal voltage divided by the resistance type potential dividers R3 and R4. A diode D6 connected between the emitter and the collector of the transistor Q1 serves the function of protecting the transistor Q1. Likewise, a diode D7 connected between the emitter and the collector of the transistor Q2 serves the function of protecting the transistor Q2. A diode D8 connected in parallel with the resistor R1 and a diode D9 connected in parallel with the resistor R3 increase the turning-off speed of the transistors Q1 and Q2, respectively. A resistor R5 and a capacitor C5 and a diode D10 which are connected respectively across the two terminals of the primary winding of the driving transformer 36 form a snubber. The snubber eliminates an impulse noise generated in the primary winding 38 of the driving transformer 36.

In the power supply for the conventional microwave range, since the PWM signal generated from the controller is transmitted to the transistors Q1 and Q2, which are used as a controlling switch element through the driving transformer, the DC voltage level of the PWM signal applied to the transistors Q1 and Q2 is varied. Due to this, where the high logic component of the PWM signal has a very small duty cycle, the difference in voltage between the DC voltage level of the PWM signal applied to the transistors Q1 and Q2 and the voltage level of the low logic state is small and, on the contrary, where the high logic component of the PWM signal has a duty cycle of more than 50%, the difference in voltage between the DC voltage level of the PWM signal applied to the transistors Q1 and Q2 and the voltage level of the high logic state is small. Accordingly, when the power supply for a conventional microwave range includes a voltage driving type switching element such as a field effect transistor (FET) or an insulated gate bipolar transistor (IGBT), there is a problem in that the output voltage of the power supply is not freely varied by the voltage driving type switching element.

SUMMARY OF THE INVENTION

Accordingly, it is an object of the present invention to provide a power supply for a microwave range, which is capable of freely varying the output voltage by utilizing a voltage driving type switching element.

A second object of the present invention is to provide a power supply for microwave range, which is capable of using each of two commercial AC power lines of different voltage levels.

In order to accomplish the first object, the power supply for the microwave range of the present invention comprises a transformer for transforming voltage from a DC power source, a voltage driving type switching means for driving said transformer in response to a switching signal, a control means for generating the switching signal pulse-width modulated to a predetermined frequency, a driving transformer for transmitting the switching signal toward said switching means, and a buffing means being connected between said driving transformer and said switching means for allowing the switching signal to have a constant DC level and swing width.

In order to achieve the second object, the power supply for the microwave range of the present invention comprises a means for by rectifying and filtering a commercial AC voltage of 110 v or 220 v to generate a DC voltage, a transformer having a primary winding, a primary auxiliary winding and a secondary winding for transforming DC voltage generated at said rectifying and filtering means, a first switching means for driving said first winding and first auxiliary winding of the first transformer according to a switching signal, a control means for generating the switching signal modulated to a predetermined frequency, a second transformer for electrically isolating said control means from said first switching means and transmitting the switching signal from said control means to said first switching means, a buffering means being connected between said driving transformer and said controlling switch means causing the switching signal to maintain a constant DC level and swing width, second switch means for connecting in parallel and in series the primary auxiliary winding to the primary winding of said transformer, and a second rectifying and filtering means for rectifying and filtering an alternating current voltage from the secondary winding of said first transformer to supply a magnetron with a main direct current voltage.

Other objects and advantages of the present invention may be more clearly understood via a detailed description of the following embodiment of the present invention, with reference to the accompanying drawings.

DETAILED DESCRIPTION OF THE PREFERRED EMBODIMENT

Figure 1:
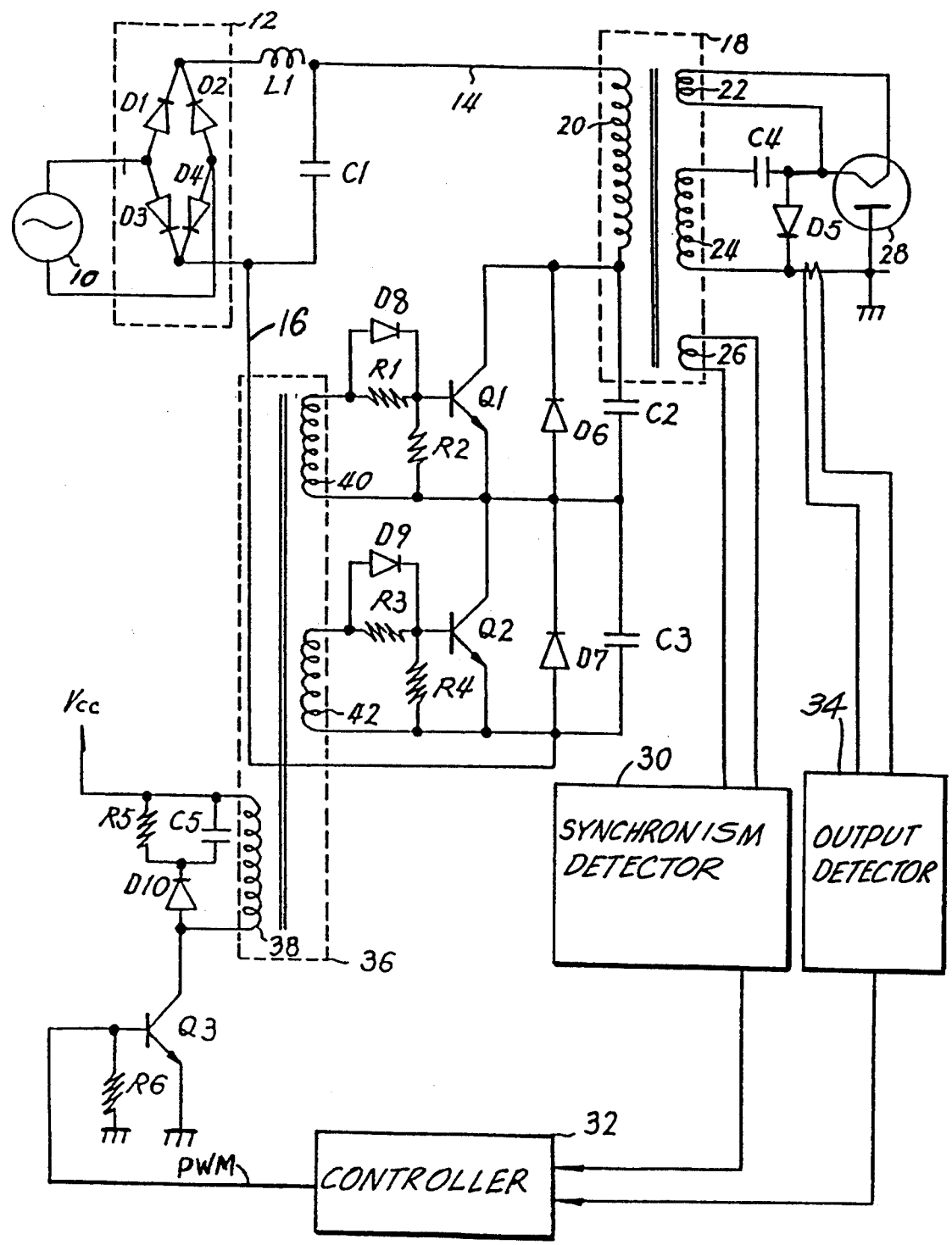
FIG. 1 is a circuit diagram of a power supply for a microwave range of the prior art.
Figure 2:
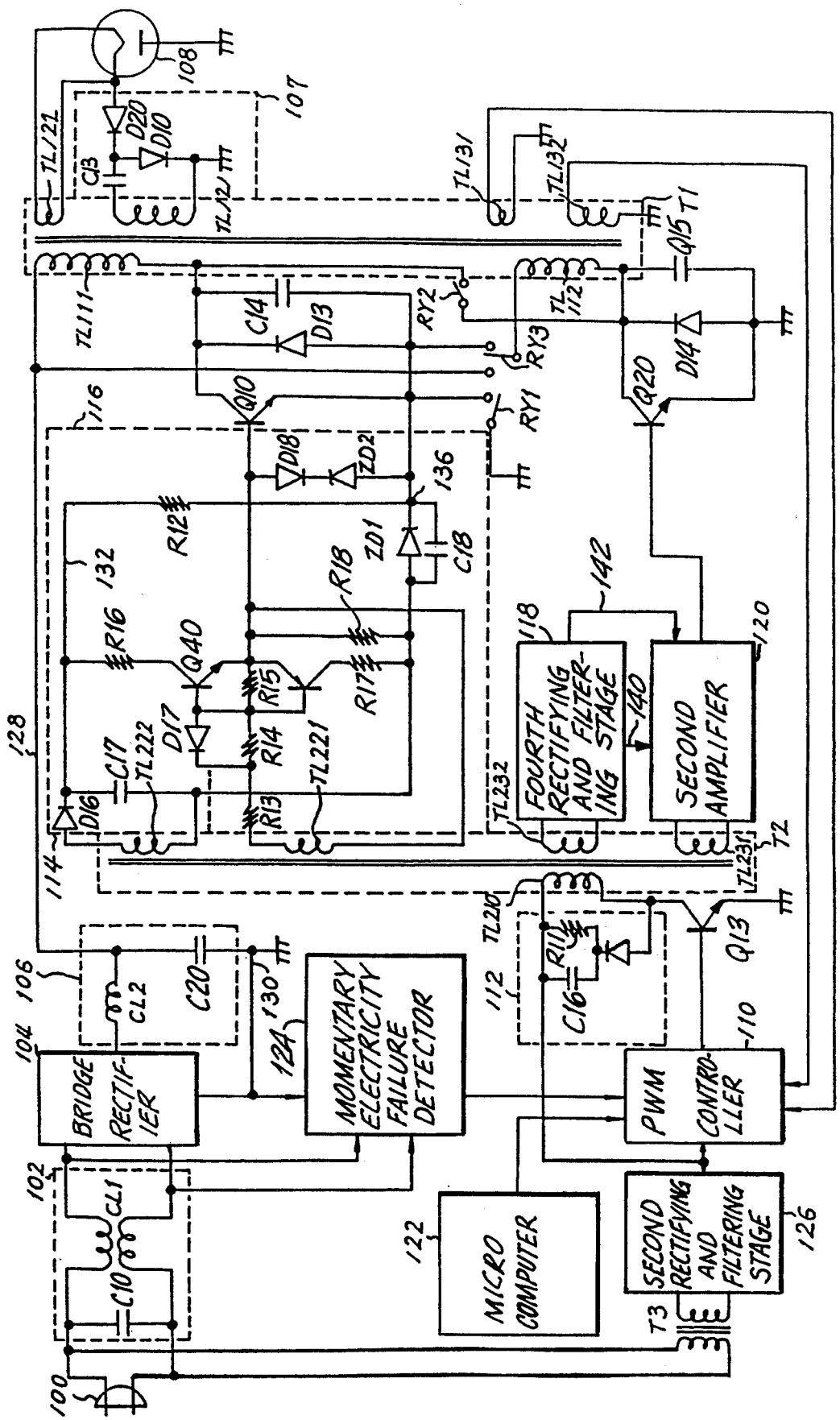
FIG. 2 is a circuit diagram of a power supply for a microwave range, in accordance with a preferred embodiment of the present invention.

Referring to FIG. 2 there is illustrated a power supply for a microwave range in accordance with an embodiment of the present invention including a connector 100 for inputting a commercial AC voltage. A first filter 102 connected to the connector 100 filters the AC power so as to prevent electromagnetic interference. The first filter 102 comprises a capacitor C10 and a choke coil CL1 connected to both terminals of the connector 100, and applies the filtered AC power to a bridge rectifier 104. The bridge rectifier 104 rectifies the filtered AC power from the first filter 102 so as to produce a unregulated DC voltage to be supplied to a second filter 106. The second filter 106 filters the unregulated DC voltage from the bridge rectifier 104 and supplies the regulated DC voltage between a positive line 128 and a negative line 130. The second filter 106 consists of a choke coil CL2 connected between an output terminal of the bridge rectifier 104 and the positive line 128 and a capacitor C20 connected between the positive and negative lines. The negative line 130 is connected also to the other output terminal of the bridge rectifier.

The power supply also includes a first transformer T1 having a primary winding TL111, connected with a terminal to the positive line 128. The first transformer T1 also includes a primary auxiliary winding TL112, a secondary winding TL121, a secondary auxiliary winding TL122, tertiary winding TL131, and tertiary auxiliary winding TL132. A rectifying and filtering stage 107 connected to the secondary winding TL121 of the first transformer T1 rectifies and filters the AC voltage induced to the secondary winding TL121, and generates a main DC voltage of approximately 400 v to be applied between an anode and a heater circuit of the magnetron 108. The rectifying and filtering stage 107 is composed of a serial circuit consisting of a capacitor C13 and a diode D1 connected between both ends of the secondary winding TL121 of the first transformer T1, and a diode D20 connected between a connecting node of the capacitor C13 together with the diode D10 and a terminal of the heater circuit of the magnetron 108. The secondary auxiliary winding TL122 of the first transformer T1 applies an AC voltage of approximately 3.5 v to the heater circuit of the magnetron 108. The magnetron 108 is driven by the DC voltage from the rectifying and filtering stage 107 and the AC voltage from the secondary auxiliary coil winding TL122 of the transformer T1 so as to generate a microwave. The microwave cooks a food contained in a container (not shown).

Figure 3A:
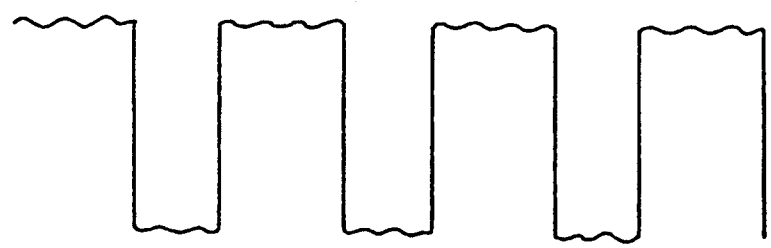
FIG. 3A is a waveform chart of an output of the PWM controller shown in FIG. 2.

Also, the power supply includes a PWM controller 110 for receiving AC voltage from a tertiary winding TL131 and a tertiary auxiliary winding TL 132 of the first transformer T1. The PWM controller 110 includes an output detector (not shown) for detecting an output voltage from the tertiary winding TL131 of the first transformer T1, and a synchronism detector (not shown) for detecting the zero crossing portion of the AC voltage from the tertiary auxiliary winding TL132 of the first transformer T1. The PWM controller 110 generates a PWM signal as shown in FIG. 3A. The pulse width of the PWM signal is varied according to the output from the voltage detector, and the period of the PWM signal is kept constant by an output signal from the synchronism detector. The PWM controller 110 is driven by a microcomputer 122.

The power supply further includes a third transformer T3 connected between the connector 100 and the second rectifying and filtering stage 126, and a momentary electricity failure detector 124 for inducing the filtered commercial AC power from both output terminals of the first filter 102. The third transformer T3 voltage-down-transforms the commercial AC voltage from the connector 100, and the second rectifying and filtering stage 126 rectifies and filters the dropped AC voltage from the third transformer T3 so as to apply to the PWM controller 110. The momentary electricity failure detector 124 monitors the output of the first filter 102 and detects momentary electrcity failures, applying the detected resultant to the PWM controller 110.

The power supply includes a second transformer T2 connected with a primary winding TL210 between the output of the second rectifying and filtering stage 126 and the collector of a transistor Q13. The transistor Q13 is turned on/off in response to the PWM signal, as shown in FIG. 3A, applied to its base from the PWM controller 110, causing a current path of the primary winding TL210 of the second transformer T2 to be opened/closed.

The second transformer T2 transforms a DC voltage applied to the first winding TL210 as the transistor Q13 is turned on/off and induces it to a secondary winding TL221, a secondary auxiliary winding TL222, a tertiary winding TL231 and a tertiary auxiliary winding TL232. At this moment, an inverted PWM signal as shown in FIG. 3A is induced to the secondary winding TL221, the secondary auxiliary winding TL222, the tertiary winding TL231 and the tertiary auxiliary winding TL232. A snubber 112 consisting of a resistor R11, a capacitor C16 and a diode D15 is connected to both terminals of the first coil winding TL210 of the driving transformer T2, and the snubber 112 eliminates the impulse noise generated in the primary winding TL210 of the second transformer T2.

Additionally, the power supply includes a transistor Q10 connected with its collector to the other end of the primary winding TL111 of the first transformer T1 and a transistor Q20 coupled with its collector to an end of the primary auxiliary winding TL112 of the first transformer T1. A resonance capacitor C14 and a damping diode D13 are connected in parallel between a collector and an emitter of the transistor Q10, while a resonance capacitor C15 and a damping diode D14 are connected in parallel between a collector and an emitter of the transistor Q20.

The damping diodes D13 and D14 respectively serve the function of protecting the transistors Q10 and Q20. The transistor Q10 is turned on/off in response to the PWM signal so as to open and close the current path of the primary winding TL111 of the first transformer T1. Also, the transistor Q2 opens and closes the current path of the first transformer T1 in response to the PWM signal.

The power supply also includes three relays RY1--RY3 driven by the PWM controller 110 so as to enable to use the commercial AC voltage of 110 v and 220 v. The first relay RY1 is connected between the emitter of the transistor Q10 and the negative line 130, while the second relay RY2 is connected between a collector of the transistor Q10 and a collector of the transistor Q20. The third relay RY3 comprises a first selective contact point connected to the positive line 128, a second selective contact point connected to the emitter of the transistor Q10, and a movable contact point connected to the end of the primary auxiliary winding TL112 of the first transformer T1. The first and the second relays RY1 and RY2, in the case of a commercial AC voltage of 220 v being input to the connector 100, are turned off and connect in parallel a parallel circuit consisting of the transistor Q10, the resonance capacitor C14 and the diode D13, as well as a circuit consisting of the transistor Q20, the resonance capacitor C15 and the diode D14, to the primary winding TL111 of the first transformer T1, and the movable contact point of the third relay RY3 is put in contact with the first selective contact point and connects in parallel the primary auxiliary winding TL112 of the first transformer T1 with the primary winding TL111. In this case, the transforming ratio of the first transformer T1 becomes four (4). On the other hand, in the case of a commercial AC voltage of 110 v being input to the connector 100, the first and the second relays RY1 and RY2 are turned on and the movable contact point of the third relay RY3 is put in contact to the second selective contact point, so as to connect in series the primary winding TL111 and the primary winding TL112 of the first transformer T1, the parallel circuit consisting of the capacitor C14, the diode D13 and the transistor Q10, and the parallel circuit consisting of the capacitor C15, the diode C14 and the transistor Q20, between the positive and negative lines 128 and 130. In this case, the transforming ratio of the first transformer T1 becomes two (2).

Figure 3B:
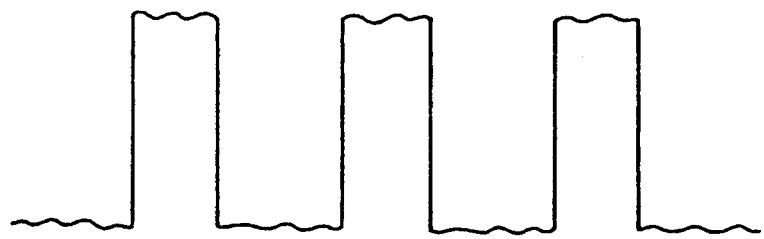
FIG. 3B is a waveform chart of an output of the second transformer T2 shown in FIG. 2.
Figure 3C:
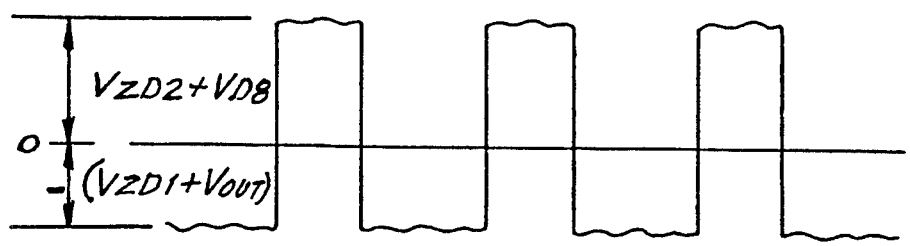
FIG. 3C is a waveform chart of a buffered switching signal applied to the transistors Q1 and Q2 shown in FIG. 2.

The power supply further includes a first amplifier 116, a third rectifying and filtering stage 114, a second amplifier 120 and a fourth rectifying and filtering stage 118 respectively connected to the secondary winding TL221, the secondary auxiliary winding TL222, the tertiary winding TL231, and the tertiary auxiliary winding TL232 of the second transformer T2. The third rectifying and filtering stage 114 comprises a diode D16 and a capacitor C17 connected in series to both ends of the secondary auxiliary winding TL222 of the second transformer T2, and half-wave-rectifies and filters the transformed PWM signal from the secondary auxiliary winding TL222 so as to apply a regulated DC voltage to a point between the second positive line 132 and a negative line 138. Both ends of the capacitor C17 are connected to a point between the second positive line 132 and the negative line 138. The first amplifier 116 comprises transistors Q40 and Q50 each connected with its own emitter to an end of the secondary winding TL221 of the second transformer T2. Bases of the transistors Q4 and Q50 are commonly connected to a parallel circuit consisting of the resistor R14 and the diode D17 connected to the resistor R13 and the resistor R13 connected to another end of the secondary winding TL221 of the second transformer T2. The transistors Q40 and Q50 operate complementarily to each other. The transistors Q40 and Q50 amplify and buffer the transformed PWM signal, as shown in FIG. 3B, applied from the other end of the secondary winding TL221 of the second transformer T2 through the resistors R13 and R14 to the base, in order to generate an amplified and buffered PWM signal. The amplified and buffered PWM signal has a pulse of the low logic state having a summed voltage ($-(Vcut+Vzdl)$) equal to the sum of the operating voltage (Vcut) of the transistor Q10 and the operating voltage (Vzdl) of a Zener diode (ZD1) connected between the collector of the transistor Q5 and the emitter of the transistor Q10. The PWM signal has a pulse of a high logic state having a summed voltage (Vzd2+Vd8) equal to the sum of the operating voltages of a Zener diode ZD2 and diode D18 connected in series between the base of the transistor Q10 and the connecting point 136 of the Zener diode ZD1 and the resistor R12, and a DC voltage level of "0" v. The first amplifier 116 further includes a bias resistor R15 commonly connected between the bases and emitters of both transistor Q40 and Q50, a pull-up resistor R16 connected between a collector of the transistor Q40 and the second positive line 132, a pull-down resistor R17 connected between the collector of the transistor Q50 and the negative line 138, and a load resistor R18 connected between the emitter of the transistor Q50 and the negative line 138. The amplified and buffered PWM signal is applied from the connecting point of the emitters of the two transistors Q40 and Q50 to the base of the transistor Q1 so as to stably drive the transistor Q10. On the other hand, the fourth rectifying and filtering stage 118 has the same configuration as the third rectifying and filtering section 114, and the second amplifier 120 has the same configuration as the first amplifier 116. The fourth rectifying and filtering stage 118 half-wave-rectifies and filters the transformed PWM signal from the tertiary auxiliary winding TL232 of the second transformer T2 and supplies the DC voltage through a third positive line 140 and a negative line 142 to the second amplifier 120. The second amplifier 120 amplifies and buffers also the transformed PWM signal from the tertiary winding TL231 of the second transformer T2 and applies the amplified and buffered PWM signal, as shown in FIG. 3C, to the base of the transistor Q20. The transistor Q20 is turned on/off stably in response to the amplified and buffered PWM signal from the amplifier 120.

As described above, the present invention buffers the PWM signal so as to keep constantly the DC voltage level, low level and high level of the PWM signal being applied to the voltage driving type switching element for driving the transformer irrespective of duty ratio of the PWM signal. By this means, the voltage driving type switching element is allowed to drive correctly and, owing to this, the present invention has the advantage that the transformed output is widely varied.

Also, by utilizing the control switch, the present invention allows the number of the primary winding of the transformer to be varied in accordance with the AC voltage of 110 v or 220 v being used. Therefore, the present invention has the additional advantage of being able to use 110 v and 220 v commercial AC voltages.

What is claimed is:

1. A power supply for a microwave range comprising:
   a first transformer for transforming a direct current voltage from a direct current voltage source;
   a voltage driving type switching means coupled to said first transformer for driving said first transformer in response to a switching signal;
   a control means for generating the switching signal and coupled to said switching means for applying the switching signal to said switching means, said switching signal being pulse-width-modulated to a predetermined frequency;
   a second transformer operatively connected to said control means, for electrically isolating said control means from said switching means and for transmitting to switching means said switching signal from said control means; and
   a buffering means for driving said switching means, said buffering means being coupled between said second transformer and said switching means for buffering and amplifying the switching signal from said second transformer to generate an amplified buffered switching signal having a constant direct current voltage level and a constant swing width and supply said amplified switching signal to said switching means.

2. A power supply as defined in claim 1, wherein said buffering means comprises:
   an amplifying means for amplifying the switching signal from said second transformer; and
   a first clamping means for clamping high level components of the amplified switching signal from said amplifying means at a predetermined level which is higher that said constant direct current voltage level to supply said switching means with a clamped switching signal.

3. A power supply as defined in claim 2, wherein said first clamping means includes a zener diode.

4. A power supply as defined in claim 2, wherein said buffering means further comprises a second clamping means for clamping the amplified switching signal from said amplifying means at a predetermined level which is lower than said constant direct current voltage level to supply said switching means with the clamped switching signal.

5. A power supply as defined in claim 4, wherein said second clamping means includes a zener diode.

6. A power supply as defined in claim 4, wherein said buffering means further comprises a rectifying means, coupled to said amplifying means, for rectifying and filtering the switching signal from said second transformer to supply said amplifying means with a regulated direct current voltage.

7. A power supply as defined in claim 6, wherein said amplifying means includes a push-pull amplifier.

8. A power supply as defined claim 2, wherein said buffering means further comprises a rectifying means, coupled to said amplifying means, for rectifying and filtering the switching signal from said second transformer to supply said amplifying means with a regulated direct current voltage.

9. A power supply as defined in claim 1, wherein said switching means is a field effect transistor.

10. A power supply as defined in claim 1, wherein said switching means is an insulated gate bipolar transistor.

11. A power supply for a microwave range comprising:
    a first rectifying and filtering means for rectifying and filtering a commercial alternating current voltage of 110 v or 220 v to produce a direct current voltage:
    a first transformer coupled to said first rectifying and filtering means and having a primary winding, a primary auxiliary winding and a secondary winding for transforming the direct current voltage from said first rectifying and filtering means;
    a first controlling switching means, coupled to said first transformer, for driving the primary winding of said first transformer in response to a switching signal;
    a control means for generating said switching signal and being coupled to said first controlling switching means for applying the switching signal to said first controlling switching means, said switching signal being pulse-width-modulated to a predetermined frequency;
    a second transformer operatively connected to said control means, for isolating said control means from said first controlling switching means to transmit said switching signal from said control means to said first controlling switching means;
    a buffering means for driving said first controlling switching means, said buffering means being coupled between said second transformer and said first controlling switching means for buffering and amplifying said switching signal from said second transformer to generate an amplified buffered switching signal maintaining a constant predetermined direct current voltage level and swing width and to supply said amplified switching signal to said first controlling switching means;
    a second controlling switching means for connecting in parallel or in series the primary auxiliary winding to the primary winding of said first transformer;
    a magnetron; and
    a second rectifying and filtering means, coupled to said magnetron, for rectifying and filtering an AC voltage from the secondary winding of said first transformer to supply a main direct current voltage to said magnetron.

12. A power supply as defined in claim 11, wherein said second controlling switching means comprises:

a first controlling switching element for selectively connecting one end of the primary auxiliary winding of said first transformer to one end or another end of the primary winding of said first tansformer;

a second controlling switch element for selectively connecting another end of the primary auxiliary winding of said first transformer to another end of the primary winding of said first transformer and to said first controlling switching means; and a third controlling switch element for opening and closing another end of the primary winding of said first transformer with said first controlling switching element.

13. A power supply as defined in claim 12, wherein said first, second and third controlling switch elements are relays.

14. A power supply as defined in claim 13, wherein said relays are controlled by the control means.

15. A power supply as defined in claim 14, further comprising a resonance capacitor connected in parallel with said first controlling switch means.

16. A power supply as defined in claim 15, further comprising a diode for preventing damage to said first controlling switch means.

17. A power supply as defined in claim 11, wherein said buffering means comprises:

a means for amplifying the switching signal from said second transformer; and a means for clamping the amplified switching signal from said amplifying means to supply the clamped switching signal to said first controlling switching means.

18. A power supply as defined in claim 17, wherein said clamping means includes zener diodes.

19. A power supply as defined in claim 17, wherein said buffering means further comprises means for rectifying and filtering the switching signal from said second transformer to supply said amplifying means with a regulated direct current voltage.

20. A power supply for a microwave range, comprising:

first rectifying and filtering means for rectifying and filtering a commercial alternating current voltage of 110 v or 220 v and producing a direct current voltage;

a first transformer, coupled to said first rectifying and filtering means and having a primary winding, a primary auxiliary coil winding and a secondary winding, for transforming the direct current voltage from said first rectifying and filtering means;

a first controlling switch means, coupled to said first transformer, for driving the primary winding of said first transformer in response to switching signal;

a second controlling switch means, coupled to said first transformer for driving the primary auxiliary winding of said first transformer in response to the switching signal;

a control means for generating the switching signal and being coupled to said first and second controlling switch means for supplying the switching signal to said first and second controlling switch means, said switching signal being pulse-width-modulated to a predetermined frequency;

a second transformer, operatively connected to said control means, for electrically isolating said control means from said first and second controlling switch means and for transmitting the switching signal from said control means to said first and second controlling switch means;

a first buffering means for driving said first controlling switch means and being coupled to said second transformer and said first controlling switch means, for buffering and amplifying said switching signal from said second transformer to generate an amplified buffered switching signal having a constant direct current voltage level and a constant swing width and supply said amplified switching signal to said first controlling switch means;

a second buffering means for driving said second controlling switch means and being coupled between said second transformer and said second controlling switch means, for buffering and amplifying said switching signal from said second transformer to generate an amplified buffered switching signal having a constant direct current voltage level and a constant swing width and supply said amplified switching signal to said second controlling switch means;

a third switch means for connecting in series or in parallel the primary auxiliary winding of said first transformer and said second controlling switch means with said first controlling switch means and, the primary winding of said first transformer;

a magnetron; and a second rectifying and filtering means for rectifying and filtering an alternating current voltage from the secondary winding of said first transformer to generate a main direct current to supply a main direct current voltage to said magnetron.

* * * * *